United States Patent Office 3,453,801
Patented July 8, 1969

3,453,801
METHOD AND APPARATUS FOR WRAPPING ARTICLES
Roger H. Stohlquist, Rockford, Ill., assignor to Anderson Bros. Mfg. Co., Rockford, Ill., a corporation of Illinois
Filed Feb. 27, 1967, Ser. No. 618,739
Int. Cl. B65b 53/02, 11/10
U.S. Cl. 53—33                                    29 Claims

ABSTRACT OF THE DISCLOSURE

Articles, either singly or in groups, are wrapped by advancing the articles along a path into one side of a curtain of the wrapping material to draw the material across the lead and at least partially along the top and bottom sides of the article. Overlapping portions of the curtain are then brought together closely adjacent the trail side of the article, and the overlapping portions are severed and sealed at opposite sides of the severance by jaws while advancing the articles along the path in pushing engagement with the trail side of the article. After severance, the curtain is retracted for engagement with the lead side of the next succeeding article.

BACKGROUND OF THE INVENTION

The present invention relates to a method and apparatus for wrapping articles in a web of heat-sealable material and preferably heat-shrinkable plastic material.

Apparatus has heretofore been made for wrapping articles in a web of heat-shrinkable material and for thereafter passing the wrapped articles through a heat tunnel to shrink the film to form a tight wrap around the article. In one form of the prior apparatus, the articles are advanced along a path into engagement with one side of a curtain of material extending crosswise of the path to draw the curtain along the lead and around the top and bottom sides of the article. In such apparatus, the web was severed and sealed at the trail side of the article by heat-sealing jaws mounted for relative reciprocation in a direction perpendicular to the path, and the arrangement was such that the advance of the article along the path had to be interrupted during closing of the jaws and during the severing and sealing of the overlapping portions of the curtain at the trail side of the article. Thus, the time required for closing the jaws and for sealing and severing the webs at the trail side of the article is additive with respect to the transfer time for moving successive articles into and out of sealing position. In such machines, the time required for closing the jaws and for sealing and severing the web constitutes a substantial portion of the over-all cycle time required to complete one cycle of operations.

In another form of article wrapping apparatus, articles are positioned at spaced locations between upper and lower webs of heat-sealable material, and the webs are then sealed at spaced points intermediate the spaced articles and the articles thereafter severed from the webs. While such apparatus operates to seal and thereafter sever the webs while the articles are in motion, they effect seals only at preselected locations along the webs, which locations are spaced substantially from the ends of the adjacent articles so that the apparatus does not operate to effect a tight warp of the material around the article. More-over, such apparatus are not adapted for wrapping articles of different size or shape without adjustment or change in the structure of the apparatus to specifically accommodate the different size articles.

SUMMARY OF THE INVENTION

Articles, either singly or in groups, are advanced along a path into a curtain of material that extends crosswise of the path to draw the material along the lead side and along the top and bottom of the articles. The advance of the articles is then momentarily interrupted, and sealing jaws are moved laterally of the path into a position pressing the curtain against the trail side of the article to draw the curtain closely around the article, and the sealing jaws are then moved along the path to advance the article by pushing engagement therewith during the severing and sealing of the webs at the trail side of the article. The curtain is advantageously retracted after it has been severed from the wrapped article so that the curtain can closely engage the lead side of the succeeding article as it is advanced along the path. The path of movement of the sealing jaws is advantageously arranged so that the sealing jaws, during movement laterally of the path, also have a component of movement in a forward direction so as to not interfere with advance of the articles as they move along the path. The sealing jaws preferably include forward and rear clamping jaws at the lead and trail side of the sealing jaws, which forward and rear clamping jaws are arranged to sequentially clamp the web at the lead and then at the trail side of the sealing jaws and then form a slack loop of material between the clamping jaws to relieve tension on the web during the sealing and severing operation.

An important object of this invention is to provide a method and apparatus for wrapping articles in a heat-sealable material which effects a relatively close wrap of the material around the articles.

Another object of this invention is to provide a method and apparatus for wrapping articles in heat-sealable material which draws the web of material closely around the articles and seals the wrapper closely adjacent the trail side of the articles while the articles are in motion to reduce the over-all cycle time required for wrapping successive articles.

Another object of this invention is to provide a method and apparatus for wrapping articles in heat-sealable material which is adapted for wrapping articles of widely different size and shape without necessitating any adjustment or change in the wrapping apparatus.

Another object of this invention is to provide a method and apparatus for wrapping articles in heat-sealable material wherein the article advancing and the article sealing mechanisms are in continuous motion for high speed operation with minimum wear and tear on the machine.

Another object of this invention is to provide a method and apparatus for wrapping articles in heat-sealable material wherein the heat sealing jaws are in continuous motion and yet which does not withdraw or consume any wrapping material in the event no articles are advanced to the sealing apparatus.

Another object of this invention is to provide an apparatus for wrapping articles in heat-sealable material having an improved sealing jaw construction for sealing and severing the material.

Still another object of this invention is to provide a method and apparatus for wrapping articles in heat-sealable material wherein the webs of material are sealed and severed closely adjacent the trail side of one article and the webs of material then retracted to closely engage the lead side of a succeeding article before the wrapping of the succeeding article is completed, to thereby assure a relatively close wrap around the article.

These, together with other objects and advantages of this invention, will be more readily understood by reference to the following detailed description when taken in connection with the accompanying drawings, wherein.

The method and apparatus of the present invention are generally arranged to wrap articles in a web of material which is fusible in the presence of heat, commonly referred to as heat-sealable material. Various different thermoplastic films can be used and, preferably, the heat-sealable films are in the form of heat-shrinkable, biaxially oriented plastic films such as polyethylene, polyvinyl chloride, polypropylene, etc. When heat-shrinkable films are employed, the article is first wrapped in the film and the wrapper on the article is thereafter subjected to heat to shrink the film into tight conformity with the article.

In the method of the present invention, a curtain of heat-sealable material is supported to extend crosswise of an article path, and articles are advanced in a forward direction into one side of the curtain to draw the curtain against the lead side and at least partially along the top and bottom of the article, and jaw means are thereafter moved from the other side of the curtain laterally of the article path into a position pressing the curtain against the trail side of the article to draw the curtain closely therearound. The jaw means are then advanced along the path in pushing engagement with the trail side of the article to advance the article along the path. The curtain is clamped by the jaw means and severed and sealed at opposite sides of the severance at a point closely adjacent the trail side of the article during advance of the same along the path to separate the wrapped article from the remainder of the curtain and to rejoin the severed ends of the curtain. The curtain is then retracted for engagement with the lead side of the next succeeding article prior to completion of the wrap on the succeeding article. The sealing and severing of the wrappers at the trail side of the article is thus effected while the atricle is in motion to minimize the overall cycle time and yet in a manner to achieve a relatively close wrap of the web around the article.

Figure 1:
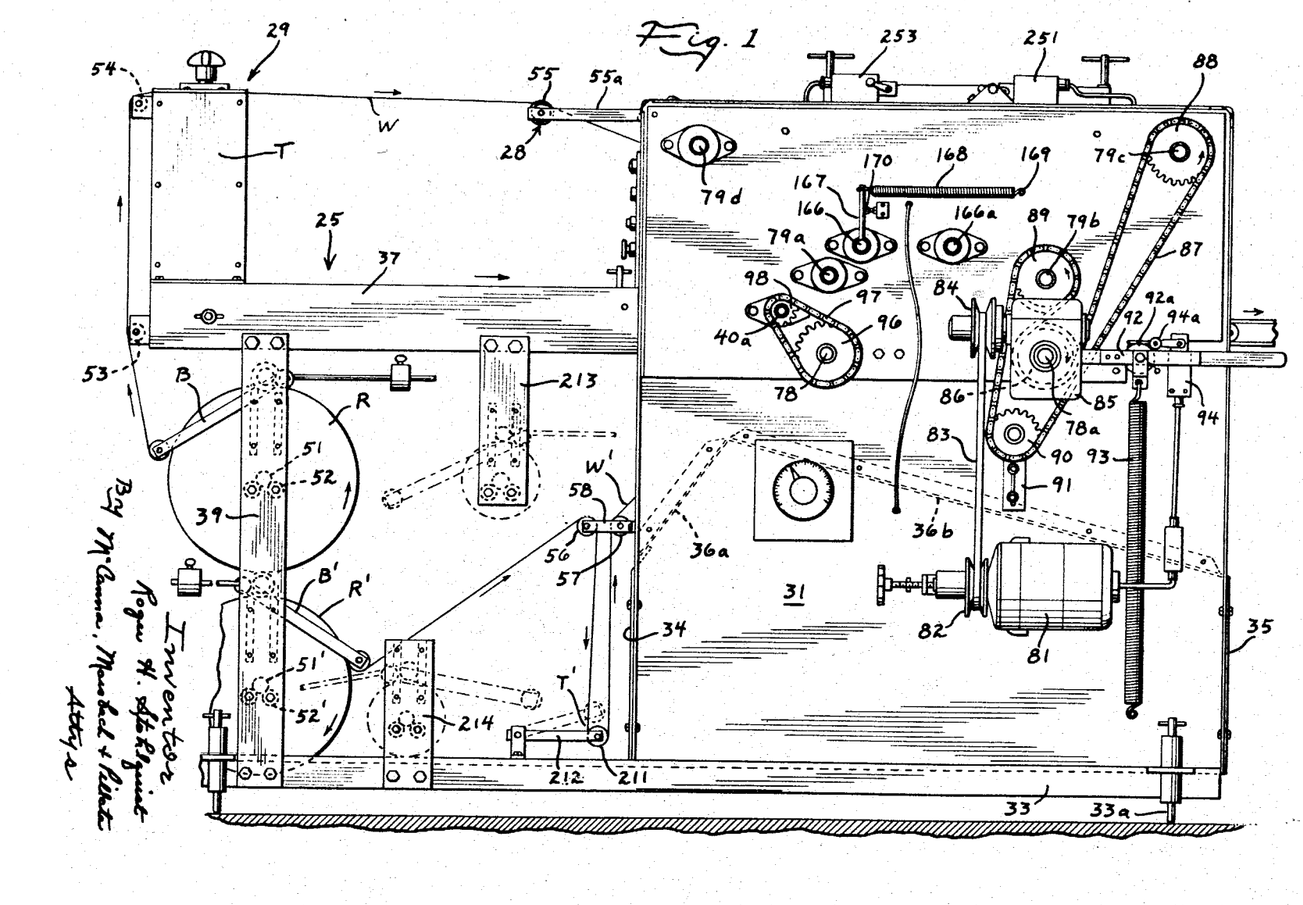
FIGURE 1 is a side elevational view of a wrapping apparatus embodying the present invetnion.

The wrapping apparatus in general includes an inlet conveyor or transfer mechanism 25 for advancing articles A along a path into a curtain of wrapping material; an article support means 26 adjacent the outlet end of the inlet conveyor means 25 which is constructed and arranged to provide a dwell support for the article advanced thereon; a jaw means 27 movable to draw the film closely along the trail side of the article on the support means and to advance the article by pushing engagement therewith along the support means; a means 28 for supporting a curtain of material to extend crosswise of the article path between the inlet conveyor means and the atricle support means, and a web feed and tensioning means 29 for feeding material as the articles are wrapped and for retracting the curtain of material after the curtain has been severed from the wrapped article. The wrapping apparatus also includes a support frame and, in the form shown, the support frame comprises laterally spaced support plates 31 and 32 disposed at relatively opposite sides of the article path and secured at their lower ends to a framework 33 mounted on legs 33a. As best shown in FIG. 1, cross plates 34 and 35 extend between the plates 31 and 32 adjacent the forward and rear ends thereof, and an intermediate cover plate having an upwardly and rearwardly inclined section 36a and a downwardly and rearwardly inclined section 36b extends between the support plates 31 and 32 adjacent the upper ends of the plate members 34 and 35. The inlet conveyor is supported on side members 37, 38 which are secured at one end to the support plates 31 and 32 and are supported at their other ends by legs 39 attached to the lower framework 33.

The inlet conveyor or transfer means 25 can be of any construction suitable for advancing the articles along a path into the curtain and onto the article support 26 and for interrupting the advance of the articles when the trail side of the articles reach a preselected position on the article support means. In the form shown, the inlet conveyor means includes a stationary article support plate 41 which has an outlet end 41a extending to a point adjacent the inlet end of the article support means 26. The plate 41 is supported as by cross members 42 on the side members 37 and 38. The means for moving the articles along the support plate is herein shown in the form of an endless conveyor including a pair of laterally spaced tracks or chains 44. The chains 44 at opposite sides of the apparatus are similarly suported by a set of sprockets 45 and 45a respectively located at the inlet and outlet ends of the support plate 41. Thte sprockets 45 at the inlet end of the support plate are conveniently secured to a common shaft 40 rotatably mounted on the side members 37 and 38, and the sprockets 45a at the outlet end of the support plate are secured to stub shafts 40a rotatably supported in bearings on the side members 37 and 38. The chains are laterally spaced apart a distance greater than the width of the largest article to be wrapped, and the side members 37, 38 are preferably of channel configuration to partially enclose the chains 44. Article engaging elements or pushers, herein shown in the form of crossbars 46, are secured to the chains at spaced points therealong and extend between the laterally spaced chains at a level above the article support 41 to advance articles therealong. As will be appreciated, the spacing between the crossbars 46 is made greater than the length measured along the path of travel of the largest article or group of articles to be wrapped on the apparatus. In order to adapt the apparatus to handle articles or groups of articles having a width less than the spacing between the side members 37 and 38, lateral article guides 48 are mounted to overlie the article support platform 41 and are supported as by slide bars 49 and locking screws 49a for adjustment laterally of the machine. The spacing between the lateral article guides 48 is adjusted to accommodate the width of the articles being wrapped and function to center the path of movement of the articles with respect to the web of wrapping material. Articles can be fed to the inlet transfer means 25 either manually or by any suitable means which will feed articles either singly or in groups, if desired. In the apparatus disclosed, the inlet transfer means 25 is open at opposite sides thereof so that articles can be advanced onto the inlet transfer means from either or both sides. Alternatively, the inlet transfer means could be made open at the inlet end thereof so that articles could be advanced onto the inlet transfer means in a direction paralleling the direction of movement of the latter.

A curtain of wrapping material is supported to extend crosswise of the path of movement of the articles in a zone intermediate the inlet conveyor means 25 and the article support means 26. The curtain is preferably formed by the end sections of two webs of heat-sealable material designated W and W' which webs are joined together by a heat-sealed joint to form the aforedescribed curtain. The webs W and W' are conveniently supplied from rolls designated R and R' respectively. The rolls R and R' can be mounted at any convenient location and the webs W and W' guided from the rolls to respectively extend above and below the article path. In the embodiment shown, the rolls R and R' have support shafts 51 and 51' supported on bearings conveniently in the form of spaced rollers 52 and 52' attached to each of the support posts 39. The web W from the roll R is guided upwardly over intermediate rollers 53 and 54 at the end of the apparatus and over a curtain support roller 55 mounted by brackets 55a on the support plates 31 and 32. The web W' from the roll R' is entrained over intermediate rollers 56 and 57 mounted by brackets 58 on the support plates 31 and 32, and the web W' extends forwardly of the inlet conveyor means 25 and is joined to the upper web W. Alternatively, if it is desired to feed articles onto the inlet conveyor 25 from the end thereof, then it is preferable to mount the roll R for the upper web W above the level of the inlet conveyor.

Figure 3:
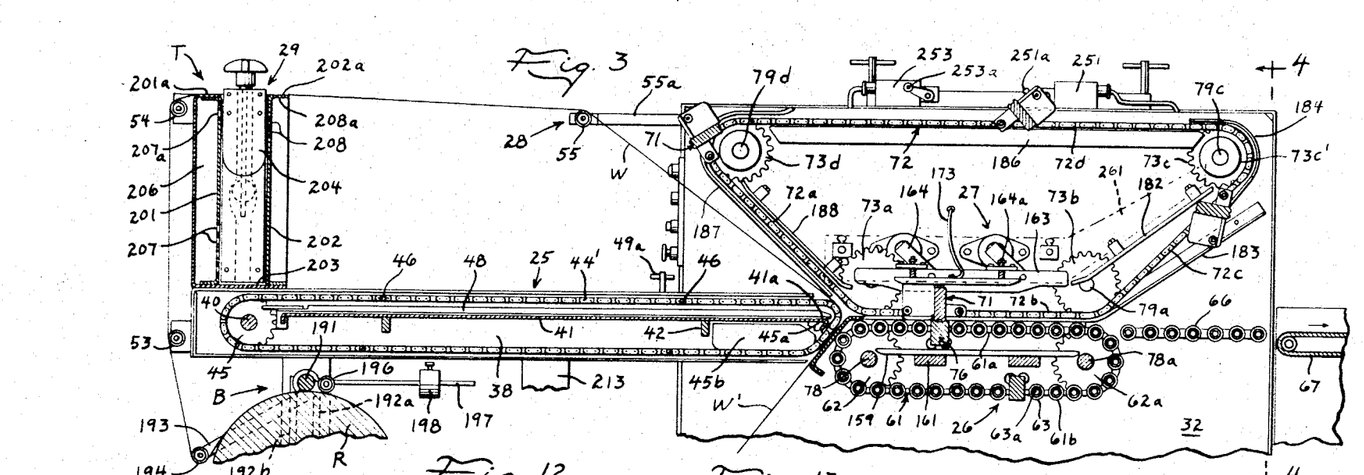
FIG. 3 is a fragmentary longitudinal sectional view taken on the plan 3—3 of FIG. 2.

As is best shown in FIG. 3, the conveyor crossbars 46 advance the articles by pushing engagement therewith until the crossbars pass around the pair of sprockets 45a at the outlet end of the conveyor. The sprockets 45a are preferably somewhat smaller than the other pair of sprockets 45 and arranged so that the axis of the sprockets 45a is disposed adjacent the level of the article support 41 whereby the maximum forward projection of the conveyor crossbars occurs adjacent the level of the article support 41 (see FIG. 5). The chains 45 are then guided so as to extend downwardly and rearwardly at an angle such as to minimize rubbing engagement with the lower web W' and, as shown in FIG. 3, the chains 44 are guided by guides 45b conveniently in the form of stationary cam blocks.

The article support means 26 is constructed and arranged to provide a dwell support for the articles advanced thereon by the inlet conveyor means 25. As used herein, the term "dwell support" refers to a support for the articles which will support the articles in a substantially stationary position after the inlet conveyor has advanced the articles thereon and until the jaw means subsequently operates to engage and continue the advance of the articles. The article support could be in the form of a stationary support plate or, alternatively, a anti-friction type support such as a bed of rollers which allows free movement of the articles onto and off of the support means but does not itself advance the same. For reasons pointed out hereinatfer, the article support means is preferably in the form of a travelling bed of rollers constructed and arranged to provide the aforedescribed dwell support. More particularly, the travelling bed of rollers includes a pair of laterally spaced lower tracks or chains designated 61 having a plurality of rollers 63 extending between the chains and constructed for free rotation relative to the chains, about the roller axes 63a. The chains 61 are located at relatively opposite sides of the wrapping apparatus and are supported by similar sets of sprockets, each set including a sprocket 62 at the inlet end of the article support means and a sprocket 62a at the outlet end of the article support means. Although the chains 61 are themselves driven in a manner and for the purpose desciröed hereinafter, the rollers 63 are free to turn about their own axes 63a so as to effectively avoid propelling or advancing the articles supported on the upper run thereof. As will be seen from FIG. 3, the chains 61 support the rollers for movement along an upper run designated 61a in which the upper surface of the rollers is disposed generally coplanar with the inlet article support 41 and the rollers move with the chains in the direction indicated by the arrows in FIG. 3 downwardly around the outlet sprocket 62a, rearwardly along the lower run 61b and then upwardly around the inlet sprocket 62. An outlet guide means, conveniently in the form of a stationary bed of rollers 66, is mounted at the outlet end of the article support means 26 and is disposed generally coplanar with the upper run thereof to receive articles as they are advanced off the support means. A means such as an outlet conveyor 67 may be used to advance the articles away from the wrapper and to a shrink tunnel (not shown) if heat-shrinkable wrapping material is used.

Figure 2:
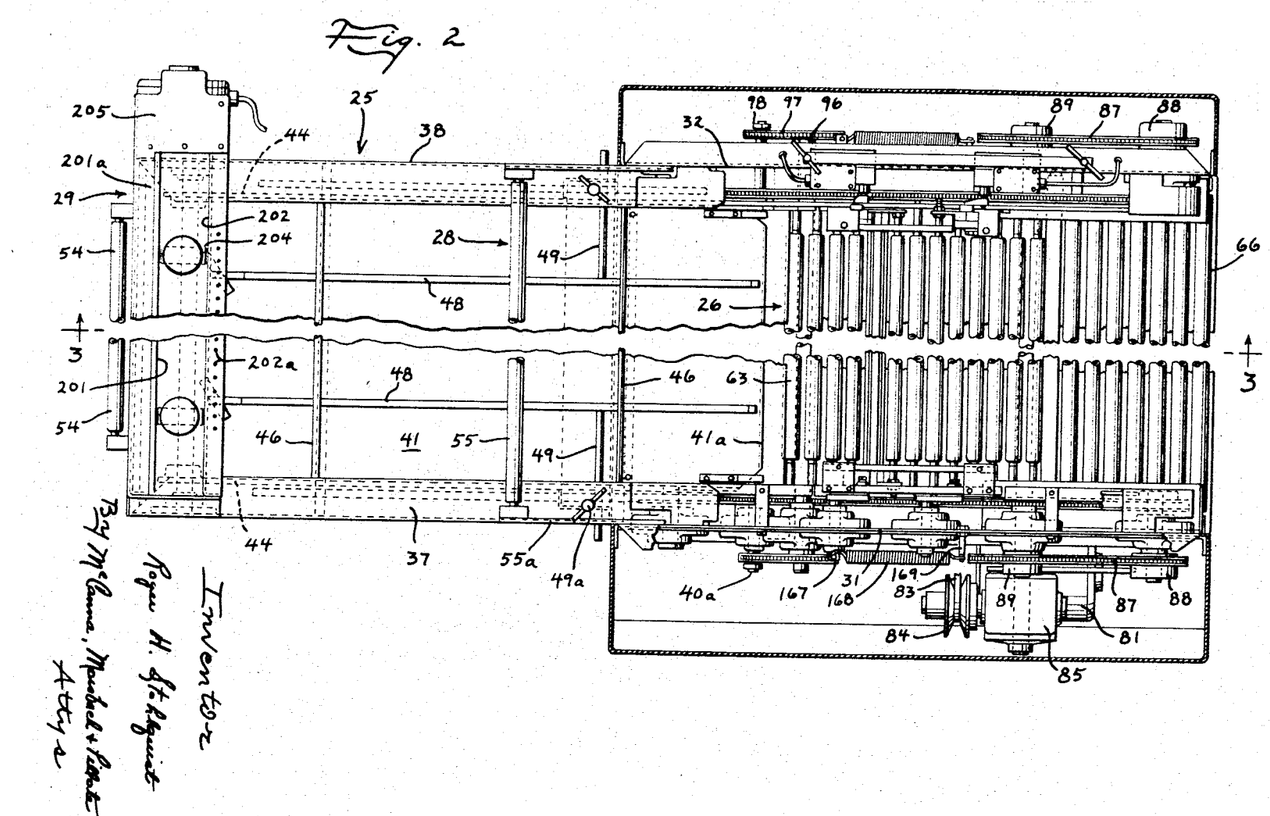
FIG. 2 is a top plan view of the wrapping apparatus of FIG. 1.
Figure 4:
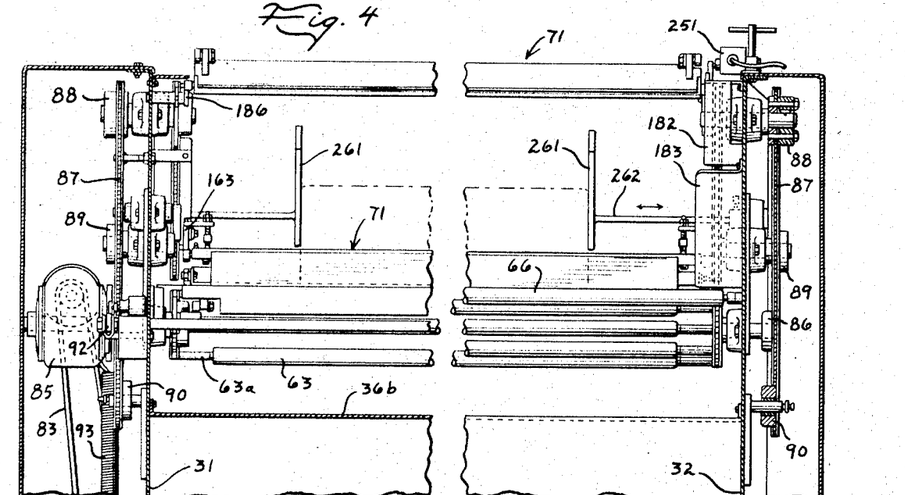
FIG. 4 is a fragmentary vertical sectional view taken on the plane 4—4 of FIG. 3 and showing the parts on a larger scale.

The articles designated A, as they are advanced by the inlet conveyor mechanism 25 through the curtain of material and onto the article support means 26, draw the curtain of material along the lead side of the articles and partially along the top and bottom sides thereof. The jaw means 27 is mounted at the other side of the curtain of material and is arranged to draw the curtain closely along the trail side of the article resting on the support means and to advance that article along the support means by pushing engagement therewith while sealing and severing the curtain at the trailing side of the article. The jaw means 27 includes at least one and preferably several upper jaw means designated 71, herein shown four in number, which are mounted for movement in a closed loop course above the article support means 26 and at the side of the curtain opposite the side engaged by the articles as they are advanced by the inlet conveyor. The upper jaw means 71 are mounted on a pair of laterally spaced upper tracks or chains 72 for movement in a closed loop course having a lower run 72b, an upper run 72d and forward and rear runs 72a and 72c respectively which extend between the upper and lower runs adjacent the forward and rear ends of the closed loop course. The chains 72 at each side of the machine are guided for movement in the closed loop course by similar sets of rollers or sprockets, each set preferably including four sprockets designated 73a–73d. The sprockets 73a and 73b of each set guide the chains during movement along the lower run 72b so that the lower run extends generally parallel to at least a portion of the upper surface of the article support means 26, and the sprockets 73c and 73d of each set guide the chains during movement through the upper run 72d and space the upper run above the article support a distance greater than the height of the articles to be wrapped so that the jaw means clears the articles during return movement of the jaws. As will be appreciated, the upper jaw means moves laterally toward the article path as it traverses the inlet run 72a and laterally away from the article path as it traverses the outlet run 72c and, in order to allow the aforedescribed lateral movement of the jaws with respect to the article path while the articles are advancing, the inlet and outlet runs are preferably arranged to respectively converge and diverge with respect to the article path. Thus, the sprockets 73d are positioned relative to the sprockets 73a such that the run 72a is inclined downwardly and forwardly toward the article path preferably at an angle of around 45° and, similarly, the sprockets 73c are positioned relative to the sprockets 73b such that the rear run 72c is inclined upwardly and forwardly preferably at an angle of around 45°. With this arrangement, the upper jaw means moves forwardly with the articles as the jaw means moves laterally inwardly and outwardly relative to the path of travel thereof. The inlet run 72a is arranged with relation to the position to which the trail side of the article is advanced by the inlet conveyor means (shown in FIG. 5) such that the path of movement of the upper jaw means along the inlet run 72a intersects the trail side of the article A in this position. Thus, the upper jaw means moves downwardly and forwardly until it engages the trail side of the article on the article support means 26 to thereby draw the web of material closely along the trail side of the article and the upper jaw means thereafter advances in "pushing engagement" with the article, with the web of material intervening between the upper jaw and the trail side of the article as shown in FIGS. 6 and 17–19, to thereby advance the article along the support means as the upper jaw means continues movement along the lower run 72b. A means is provided for clamping overlapping portions of the webs W and W' against the upper jaw means 71 after the upper jam means engages the trail side of the article on the support means and while the upper jaw means moves along at least a portion of its lower run 72b. This web clamping means preferably comprises a lower jaw means 76 which is mounted for movement with the upper jaw means 76 which is mounted for movement with the upper jaw means as the latter moves along its lower run. The upper and lower jaw means can be arranged in relation to each other so as to effect clamping and sealing of the webs at any selected level between the top and bottom of the articles. In the preferred embodiment illustrated, the upper and lower jaw means are arranged to effect a seal adjacent the bottom of the article and for this purpose are arranged so as to clamp the webs together at a level adjacent the bottom of the article. In order to clamp the webs together adjacent the level of the bottom of the articles, the lower jaw means must be disposed at about the level of the article support means and, for this purpose, the lower jaw means must be disposed at about the level of the article support means and, for this purpose, the lower jaw means 76 are attached to the lower chains 61 for movement therewith and are located between certain of the rollers 63 on the chains. Thus, the lower jaw means 76 can move in unison with the upper jaw means 71 while the latter traverses its lower run 72b and the aforedescribed travelling bed of rollers accommodates this movement of the lower jaw means while yet providing the desired dwell support for the articles when the latter are not being pushed by the jaw means. Alternatively, if the jaw means were arranged to seal at a level above the bottom of the articles, the lower jaw means could be mounted in a plane above the article support means, and in this event, it would be unnecessary to provide a tarvelling bed of rollers. The course traversed by the lower jaw means can be shorter than that of the upper jaw means and, in the embodiment shown, is one-half the upper jaw course. With this arrangement, only two lower jaws need be provided with each lower jaw means arranged to move into opposed registry with alternate ones of the upper jaw means as the latter traverses its lower run. Stated otherwise, the spacing between the lower jaw means on the chains 61 is made the same as the spacing between the upper jaw means on the chains 72 although the lengths of the two chains are different. The upper and lower jaw means are driven in timed relation with each other so that they move substantially in unison as the upper jaw means traverses its lower run. The lower sprockets 62 at opposite sides of the machine are conveniently nonrotatably secured to a cross shaft 78, and the lower sprockets 62a at opposite sides of the machine are similarly nonrotatably secured to a cross shaft 78a, the ends of which shafts are rotatably supported by bearings in the support plates 31 and 32. These cross shafts extend between the respective sprockets at opposite sides of the wrapping machine and thus drive both chains 61 in unison. However, to avoid interference with the movement of the articles and the web, the sprockets 73a–73d of each set at opposite sides of the wrapping machine are nonrotatably secured to stub shafts 79a–79d respectively, and which stub shafts do not extend across the machine but are instead independently supported by bearings in the respective support plates 31 and 32. As best shown in FIGS. 1, 2 and 4, the jaw means are driven by a drive means including a motor 81 connected through a variable speed drive comprising an adjustable diameter pulley 82, belt 83 and adjustable diameter pulley 84, connected to the input of a transmission 85. The transmission 85 is of the speed reducing type and is preferably arranged to stop the machine in the event of overload. For this purpose, the transmission output is nonrotatably connected to one of the shafts 78a, but the transmission is itself free to turn about the axis of the shaft, except as constrained by a spring 93 acting on a lever 92 secured to the transmission. The spring normally urges the lever 92 against a stop 92a. However, if the load on the drive shaft 78a becomes excessive for any reason and overcomes the tension of spring 93 acting on lever 92, the transmission 85 will turn with the shaft 78a in a counterclockwise direction as viewed in FIG. 1 to raise the lever. A switch 94 is mounted with its actuator 94a in the path of movement of the lever 92 to be operated thereby when the lever is raised. The switch is arranged as described hereinafter to stop the drive motor 81.

A sprocket 86 is nonrotatably secured to the shaft 78a adjacent each side of the machine, and these sprockets are connected through similar drive chains 87 at each side of the machine to drive sprockets 88 and 89 on the stub shafts 79c and 79b. As will be seen from the arrows in FIG. 1, the drive chains 87 are arranged so as to rotate the drive sprockets 88 and 89 in a direction opposite the direction of rotation of the sprocket 86 so that the lower chain 61 and the upper chain 72 have their upper and lower runs 61a and 72b respectively moving in a forward direction. An idler sprocket 90 is provided at each side of the machine and mounted on an adjustable bracket 91 to enable adjustment of the tension in the respective drive chain 87. The upper and lower chains 72 and 61 at opposite sides of the machine are thus driven in unison from the shaft 78a under the control of the clutch in transmission 85.

The inlet conveyor 25 is advantageously driven in timed relation with the upper and lower jaw means so as to advance an article into position onto the article support means 26 slightly in advance of the time the upper jaw means engages the trail side of the article at the support means. The inlet conveyor is preferably driven at the same linear speed as the upper jaw means 71 during movement of the same along the lower run 72b of its course. As previously described, the sprockets 45a at the outlet end of the inlet conveyor are mounted on stub shafts 40a supported by bearings in the support plates 31 and 32, and each of the stub shafts 40a is connected through a sprocket 98 and chain 97 to respective ones of sprockets 96 nonrotatably secured to one of the cross shafts 78.

Figure 5:
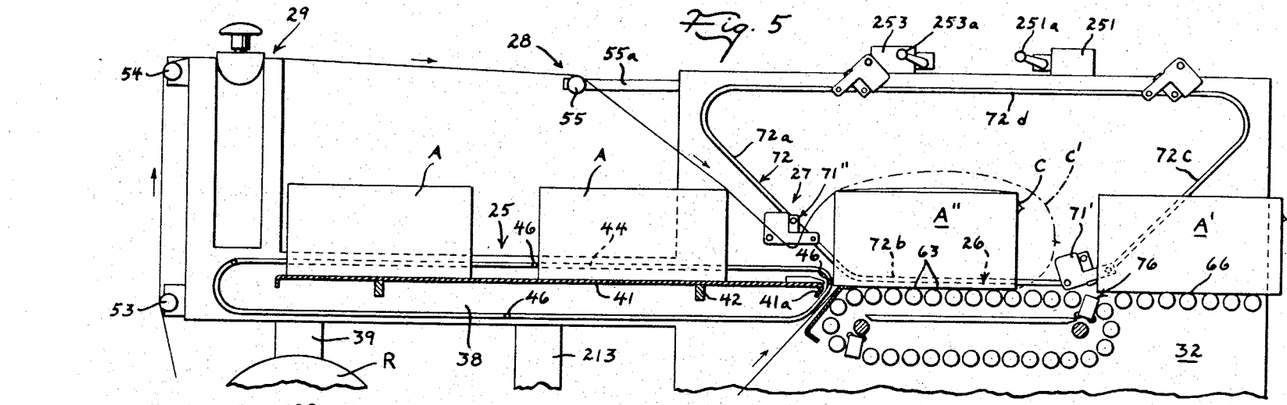
FIGS. 5 and 6 are diagrammatic longitudinal sectional views illustrating the wrapping apparatus in different moved positions.

As previously described, the crossbars 46 on the inlet conveyor advance the articles by pushing engagement with the trail side thereof and, preferably, the crossbars are arranged on the inlet conveyor so that they are disposed substantially vertically below the upper jaw means 71 at about the time the upper jaw means begins downward movement along the inlet run 72a, as shown in FIG. 3. Since the inlet run 72a is inclined downwardly and forwardly at about a 45° angle, the forward component of the movement of the upper jaw means 71 along the upper run 72d will be slightly slower than the forward movement of the crossbars 46 so that the upper jaw will reach the end of the inlet conveyor slightly later than the crossbar 46 as shown in FIG. 5. Thus, the inlet conveyor will advance the articles onto the support means 26 a short interval before the upper jaw means 71 engages the trail side of the article and continues advance of the article.

The upper jaw means 71 and lower jaw means 76 are arranged to clamp the overlapping portions of the curtain therebetween at the trail side of the article and to advance the article in pushing engagement with trail side of the article during movement of the jaw means along the lower run 72b. The jaw means are also arranged to sever the overlapping portions and to heat-seal the same at opposite sides of the severance so as to seal the wrapper at the trail side of the article and to rejoin the webs to re-form the curtain. The jaw means then releases the webs and a means is provided for retracting the webs after release by the jaw means so that the curtain can engage the lead side of the next succeeding article. When several jaw means 71 are provided on the upper tracks 72 such as the four jaw means illustrated in the present embodiment, each of the jaw means 71 is spaced along the length of the tracks 72 a distance greater than the distance through which the upper and lower jaw means 71 and 76 are maintained in clamping engagement with the webs during movement along the lower run 72b so that one jaw means will release the webs at the trail side of one article before the succeeding jaw means clamps the webs at the trail side of the succeeding article.

Figure 10:
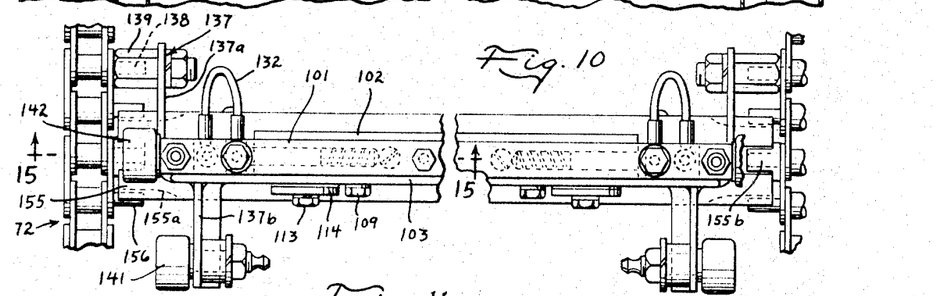
FIG. 10 is a fragmentary view taken on the plane 10—10 of FIG. 7 illustrating the top of one of the sealing jaws.
Figure 11:
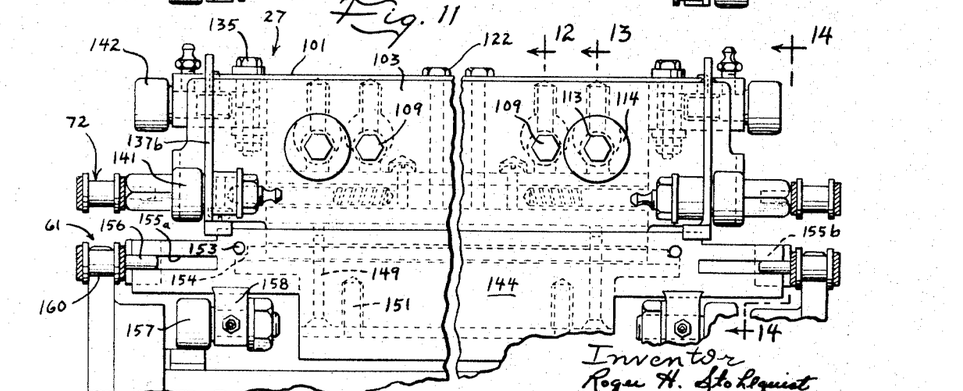
FIG. 11 is a fragmentary vertical sectional view taken on the plane 11—11 of FIG. 8 and illustrating the trail side of the sealing jaws during sealing of the webs.
Figure 12:
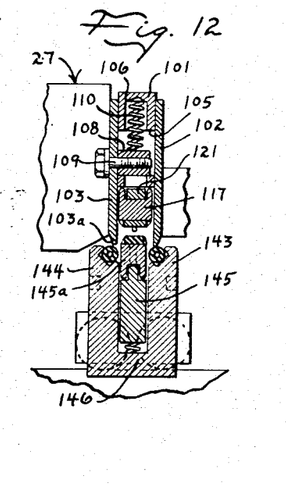
FIGS. 12, 13 and 14 are fragmentary views taken on the planes 12—12, 13—13 and 14—14 through the sealing jaws of FIG. 11.
Figure 13:
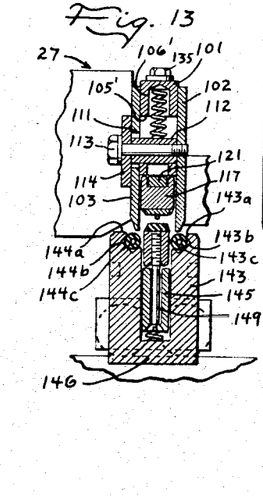
Figure 14:
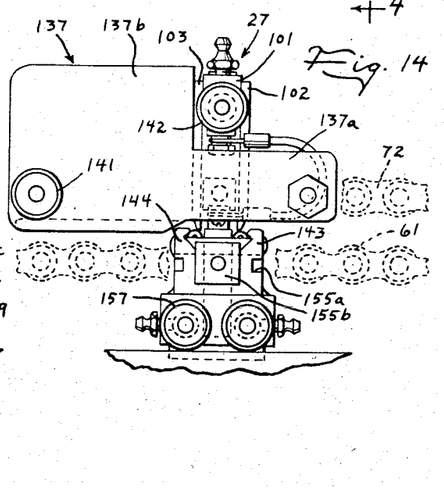
Figure 15:
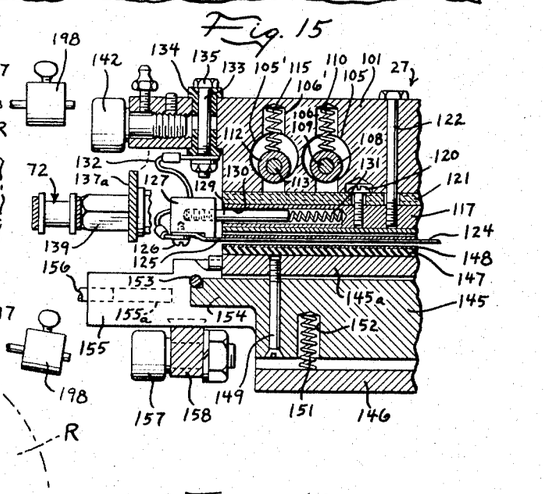
FIG. 15 is a fragmentary sectional view through the sealing jaws taken on the plane 15—15 of FIG. 10.

A presently preferred form of the jaw means is illustrated in FIGS. 10–19. Each of the upper jaw means 71 includes a jaw member 101 conveniently in the form of a relatively thick bar and forward and rear clamping jaws 102 and 103, conveniently in the form of relatively flat plates which overlie the front and rear sides of the jaw member 101. As used herein, the forward side of the jaw means is the side which leads during movement of the upper jaw means 71 along the lower run 72b of the closed loop course. The front and rear clamping jaws are supported for movement relative to the jaw member 101 and, for this purpose, the jaw member is formed with first and second sets of enlarged openings 105 and 105' which extend therethrough from the front to rear sides thereof and bores 106, 106' which extend upwardly in the jaw members, intersect the respective openings 105, 105' and terminate below the top of the jaw members. As best shown in FIGS. 12 and 15, stop blocks 108 are secured to one of the clamp jaws such as 103 by fasteners 109, and the stop blocks extend into respective ones of the first set of openings 105. The cross section of the stop blocks is smaller than the openings 105, and springs 110 are disposed in the bores 106 that intersect the aforementioned openings and engage the stop blocks 108 to yieldably urge the stop blocks and the clamp jaw 103 downwardly until the stop blocks engage the lower side of the openings 105. The other clamp jaw 102 is supported for movement relative to the jaw member 101 and also for limited movement relative to the rear clamp jaw 103. As best shown in FIGS. 13 and 15, the clamp jaw 103 has openings 111 therein in the portions that overlie the second set of openings 105' in the jaw member 101. A stop member 112 is disposed in each of the last mentioned set of openings, which stop members are secured to the front jaw 102 by fasteners 113. Each stop member 112 has a length sufficient to extend from the inner side of the front clamp jaw 102 through the respective opening 105' in the jaw member and through the opening 111 in the rear clamp jaw 103, and an enlarger washer 114 overlies the rear end of the stop member 112 and is retained in position by the head on the fastener 113. Springs 115 are disposed in the bores 106' and engage the stop members 112 to yieldably urge the forward clamp jaw downwardly relative to the jaw member 101. The openings 111 in the rear jaw 103 are made sufficiently larger than the cross section of the respective stop members 112 to allow limited vertical lost motion therebetween so that the front jaw can move relative to the rear jaw.

A sealing jaw face is provided on the jaw member 101 between the front and rear clamping jaws. In the embodiment shown, the sealing jaw face is formed by an elongated rigid bar 117 having a strip 118 of dielectric material, preferably of a non-yielding heat-resistant plastic material. The bar and strip 118 are preferably covered with a wear-resistant covering such as a flexible layer of "Teflon" impregnated fiberglass indicated at 119 which overlies the lower face of the strip 118 and extends along the sides of the bar 117 and has the ends thereof clamped to the upper side of the bar 117 by a clamp member 121 and fasteners 120 (see FIGS. 9 and 15). The bar 117 is clamped to the jaw member 101 by fasteners 122 which extend through the member 101 from the top thereof and are threaded into the bar 117, as best shown in FIGS. 11 and 15. A heat-sealing and cutting element is mounted to overlie the sealing face and, in the form shown, comprises an electrical resistance wire of "Nichrome" or the like designated 124. Connector straps 125 are brazed or otherwise secured to the ends of the wire and attached as by connector screws 126 to an electrically insulative block 127. The resistance wire 124 is adapted to be impulse heated, that is, heated by a short duration pulse of current therethrough, and provision is made for accommodating the expansion and contraction which occurs in the heated wire. As shown in FIG. 15, the connector block 127 at each end of the wire is secured to a guide rod 129 which is slidably received in a bore 130 in the bar 117, and a spring 131 is disposed in the bore to yieldably urge the guide rod 129 and connector block outwardly to tension the wire 124. As shown in FIGS. 16–19, the insulating strip 118 preferably has a shallow groove 118a therein in the region that underlies the wire 124 and which has a width slightly greater than the width of the wire and a depth less than the thickness of the wire so as to tend to maintain the heater wire centered on the sealing face.

A sliding brush arrangement is provided for supplying current to the resistance wire during movement along the lower run 72b and, as shown in FIG. 15, a wire 132 is connected by the screw fastener 126 to the resistance wire and is otherwise connected to a fastener 133 that extends through insulating plugs 134 in the jaw member 101, the outer end 135 of which member forms a brush element for cooperation with a conductor shoe to be described hereinafter.

The upper jaw means 71 are mounted on the chains 72 for movement therewith and for limited swinging movement relative thereto about an axis offset from one side, and preferably the lead side, of the jaw means. For this purpose, a jaw mounting bracket 137 is secured to the jaw means, preferably by welding to the rear clamp jaw 103, and which bracket has a portion 137a projecting forwardly of the jaws. The chains 72 are formed with laterally extending pins 138 at spaced points therealong, and a socket member 139 is attached to the forwardly extending portions 137a of each of the brackets to pivotally receive one of the pins 138. For reasons pointed out hereinafter, the bracket 137 also includes a portion 137b that extends rearwardly from the jaw means and which rearwardly extending portion has a guide roller 141 mounted thereon at a point laterally offset from the jaw members. As best shown in FIG. 10, the portion 137b of the jaw mounting bracket is offset inwardly from the portion 137a, and the guide roller 141 is mounted thereon for movement in a plane offset inwardly from the path of movement of the chains. A roller 142 is also mounted on each end of the jaw member 101 and, as also best shown in FIG. 10, is disposed in a plane offset outwardly from the plane of movement of the rollers 141.

The lower jaw means 76 also includes front and rear clamping jaw members 143 and 144 and an intermediate sealing jaw member 145. The clamping jaw members 143 and 144 and the sealing jaw member 145 are supported for relative movement and, in the form shown, the clamping jaw members 143 and 144 are rigidly interconnected by a crosspiece 146 adjacent their lower ends to form a generally U-shaped configuration, and the sealing jaw member 145 is slidably mounted between the clamping jaw members. The sealing jaw member also includes a rigid jaw back-up member 145a having a dielectric strip 147, preferably of resilient heat-resistant material such as "Neoprene" rubber, overlying the outer face thereof. A flexible cover 148, for example of "Teflon" impregnated fiberglass, extends over the strip 147 and along the sides of the back-up member 145a, and the ends of the strip are clamped between the back-up member and the sealing jaw member 145 by screw fasteners 149 which extend through the jaw member 145 and are threaded into the back-up member 145a, as best shown in FIG. 15. Springs 151 are disposed in bores 152 in the jaw member 145 and engage the crosspiece 146 to yieldably urge the sealing jaw member outwardly relative to the clamping jaws, and stop pins 153 are secured to the clamping jaws and extend therebetween to engage a projection 154 on the jaw member to limit outward movement of the latter. The clamping jaw members are preferably formed with resilient jaw faces for cooperation with the clamping jaws of the jaw means 71 and, as best shown in FIGS. 16–19, the clamping jaw members 143 and 144 have inwardly canted faces 143a and 144a respectively; recesses 143b and 144b, the base of which is also canted as previously described; and resilient, preferably tubular members 143c and 144c of resilient rubber or plastic material disposed in the recesses and projecting thereabove. The tubular members form resilient jaw faces which are yieldably deformable under the clamping pressures encountered when the clamping jaw members of the upper jaw means 71 are pressed thereagainst.

The lower jaw means is connected to the lower chains 61 for movement therewith. In the embodiment shown, the clamping jaw members 143 and 144 are formed with spaced end portions 155 and drive blocks 155b are attached to the lower chains 61 at spaced points therealong and dimensioned for reception between the end portions 155 to advance the lower jaw means with the chains 61. Spaced pins 156 are also provided on the chains 61 at opposite sides of each drive block and arranged to extend into grooves 155a in the outer faces of the end portions 155 to support the lower jaw means against movement laterally of the chains. Spaced guide rollers 157 are mounted by a bracket 158 at each end of the jaw means 76 and a guide shoe 159 is mounted as by brackets 161 on each of the support plates 31 and 32 for engaging the rollers 157 to guideably support the jaws 76 during movement along the upper runs 61a of the chain (see FIGS. 3 and 7–9). A chain guide 160 is conveniently mounted on the brackets 161 to support the lower chains during movement along their upper runs.

Figure 7:
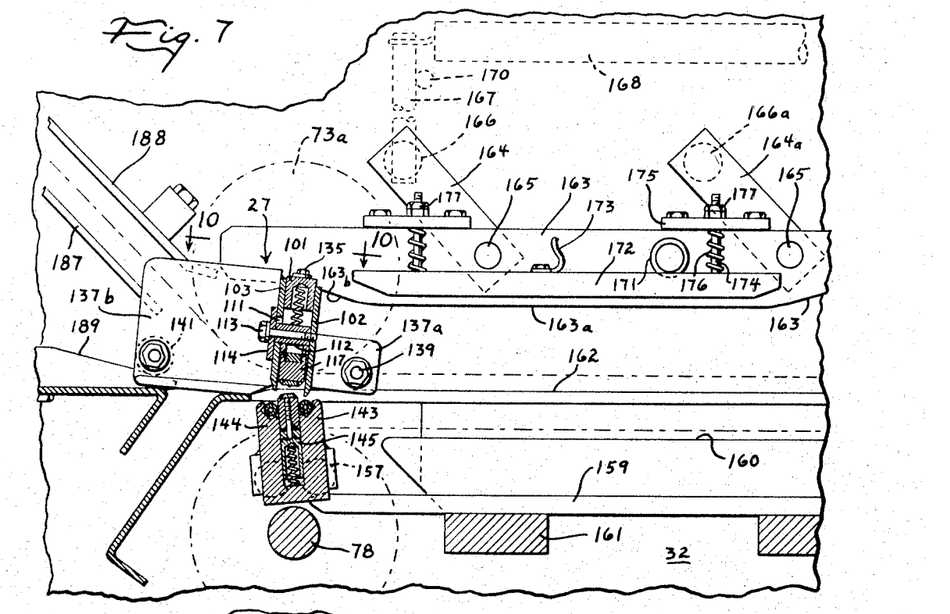
FIGS. 7, 8 and 9 are fragmentary sectional views illustrating the sealing jaws in different moved positions during the clamping and sealing of the webs.

As the upper jaw means 71 move along the lower run 72b thereof the upper jaw means are supported at a point rearwardly thereof by the rollers 141 riding on guide rails 162. However, the connection of the jaw means to the chains 72 at a joint forwardly thereof provides a floating support which accommodates limited vertical movement of the upper jaw means due to flexing of the chains 72. During movement of the upper jaw means along the lower run 72b, they are pressed downwardly into clamping engagement with the lower jaw means by a pressure-applying cam 163. The pressure-applying cam extendes generally lengthwise of the lower run and is advantageously supported for parallel movement relative thereto by a parallelogram-type linkage including generally parallel arms 164 and 164a which are pivotally connected to the cam member 163 by pins 165, 165a at spaced points along the cam, and which arms are piovtally supported on the respective support plates 31 and 32 by stub shafts 166 and 166a. A lever 167 is nonrotatably secured to one of the stub shafts such as 166, and a spring 168 is terminally attached to the lever and to an anchor 169 to yieldably urge the arms in a direction to press the cam member 163 downwardly. A stop 170 is provided for limiting downward movement of the cam member and, as shown in FIG. 7, engages the lever 167. Each cam member has an elongated pressure-applying surface 163a at its underside; a contoured inlet cam track 163b and a contoured outlet cam track 163c. The cam member is positioned in the path of movement of the rollers 142 on the sealing jaw members 101 as they move along the lower run thereof and operates to press the sealing jaw member downwardly as described more fully hereinafter.

Figure 16:
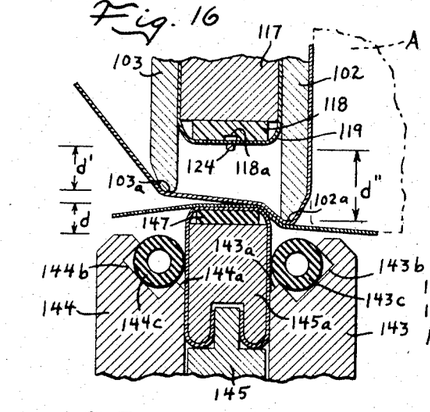
FIGS. 16–19 are fragmentary sectional views through the upper and lower sealing jaws, illustrating the same in different moved positions and on a larger scale than FIG. 12.
Figure 17:
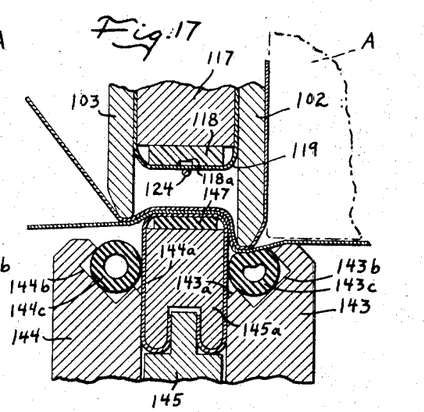
Figure 18:
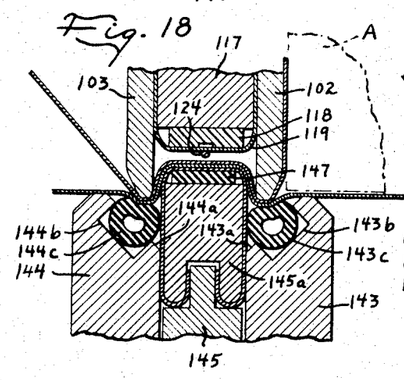
Figure 19:
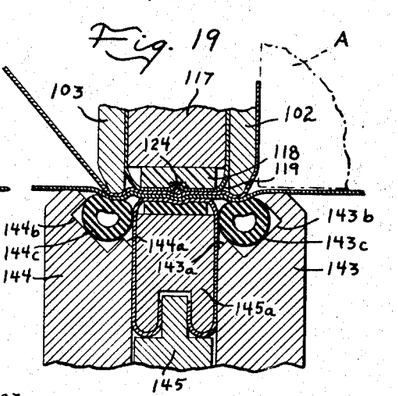

The stop pins 153 and projections 154 on the sealing jaw member 145 of the lower jaw assembly are constructed and arranged so as to limit outward movement of the lower sealing jaw to a position in which the outer face thereof is spaced a preselected distance indicated at $d$ in FIG. 16 from the outer face of the lower clamping jaw members. In the upper jaw means 71, the stop blocks 108 are arranged to engage the lower side of the openings 105 and limit outward movement of the rear clamping jaw 103 to a position in which the clamp face 103a thereof projects a distance indicated at $d'$ from the face of the upper sealing jaw, and which distance $d'$ is advantageously made greater than the distance $d$ previously described. The front clamping jaw 102 is supported for limited movement relative to the sealing jaw member 101 and relative to the rear clamping jaw 103, and the stop blocks 112 are arranged to engage the lower edges of the openings 111 in the rear clamp jaw 103 and the lower edges of the openings 105' to limit outward movement of the front clamping jaw to a position in which the clamp face 102a thereof projects a distance indicated at $d''$ which is greater than the projection $d'$ of the rear clamp jaw. The pressure-applying cam 163 is arranged so as to engage the rollers 142 on the upper jaw member to begin clamping of the web between the upper and lower jaw means only after the upper jaw means has engaged the trail side of the article on the article support means 26. As the roller rides along the underside of the inlet cam track 163b, the jaw member 101 is pressed downwardly as shown in FIGS. 7 and 16 and operates to first clamp the overlapping portions of the webs between the front clamping jaws 102 and 143 as shown in FIG. 17; then clamp the webs between the rear clamping jaws 103 and 144 as shown in FIG. 18, to draw the wrapping material over the top of the lower sealing jaw member 145; and to thereafter press the upper sealing jaw member downwardly relative to the front and rear clamping jaws 102 and 103 to bring the heat-sealing wire 124 into pressure contact with the overlapping webs between the clamping jaws and to depress the lower sealing jaw as shown in FIG. 19 to a position in which the upper surface of the sealing jaw is more nearly coplanar with the clamp faces 102a and 103a. This relieves the tension in the portions of the webs between the clamp jaws, and the upper and lower jaw means are maintained in the relative positions shown in FIG. 19 as the roller 142 rides along the pressure-applying surface 163a. The resistance wire 124 is energized during at least a portion of the time that the roller 142 is riding on the pressure-applying surface 163a to thereby sever and seal the overlapping portions of the webs while the web tension is relieved. As the roller thereafter rides along the outlet cam track 163c, the upper jaw member 101 is allowed to move upwardly relative to the front and rear clamping jaws 102 and 103 so that the upper sealing jaw moves away from the overlapping webs. However, when the machine is operated at high speeds, the upper jaw member tends to spring upwardly and tilt forwardly about the pins 138 when the rollers 142 ride along the outlet cam track 163c. In order to inhibit this forward tilting of the upper jaw means, rollers 171 are mounted on the cam tracks 163 and arranged to engage the upper edge of the portion 137b of the jaw mounting brackets 137 while the rollers 142 on the upper jaw means ride along the outlet portions 163c of the cam tracks 163.

Figure 8:
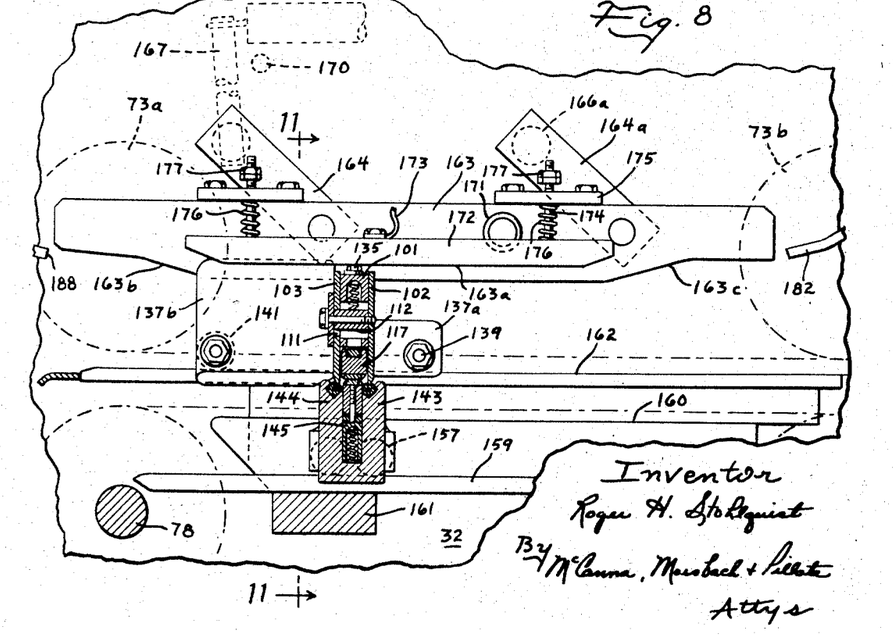
Figure 9:
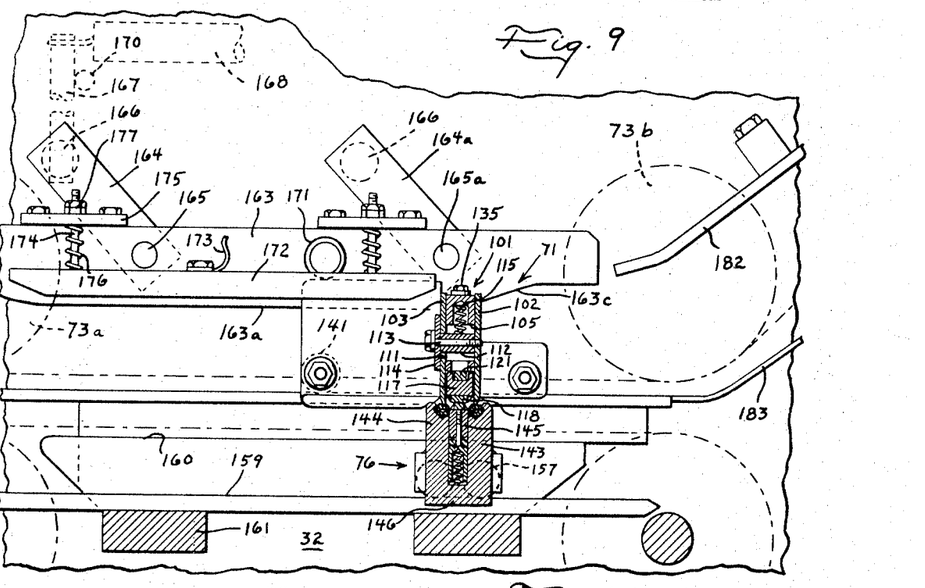

Although the resistance wire could be of the continuously energized type, it is preferably intermittently or pulse energized. As best shown in FIGS. 7–9, an electrically conductive shoe 172 is mounted in the path of movement of the brushes 135 at each end of the upper jaw means 71, and the shoes are connected through conductors 173 to a power supply means described hereinafter. The electrically conductive shoes 172 are conveniently yieldably mounted on the respective pressure-applying cam 163 and, as shown, guide rods 174 are attached to the shoe and slidably extend through insulating supports 175 attached to the pressure-applying cam. Springs 176 yieldably urge the shoe 172 downwardly, and stops 177 are attached to the guide pins to limit downward movement of the shoe.

Since the forward and rear clamping jaws 102 and 103 of the upper jaw means normally project outwardly of the wire 124 on the upper sealing jaw, it will be seen that the sealing wire is at least partially enclosed by the clamping jaws. Guide means are advantageously provided for controlling the attitude of the upper jaw means 71 during movement along the closed loop course. As shown in FIG. 3, guide rails 182 and 183 are mounted above and below the run 72c of the chain and are arranged to respectively engage the rollers 142 and 141 on the upper jaw means. The guide rails 182 and 183 are preferably inclined at a somewhat shallower angle than the run 72c to allow the upper jaw means 71 to tilt forwardly as it moves along the run 72c. The rail 182 extends generally tangent to the hub 73c' of the sprocket 73c and, as the chain passes around the sprocket, the roller 142 engages the hub to guide movement of the upper jaw means. The upper jaw means is substantially inverted as the chain passes around the sprocket 73c, and an auxiliary chain guide 184 is provided to extend around the chain as it passes over the sprocket 73c. The auxiliary chain guide is arranged to underlie the roller 141 on the upper jaw means during movement of the latter around the sprocket, and to aid in preventing downward swinging movement of the jaw means. An upper guide rail 186 is provided along the upper run 72d of the chain to underlie the path of movement of the roller 142 and support the jaws in a position as shown in FIG. 3 during movement along the upper run. A forward guide rail 187 extends from a point above the sprockets 73d around the outer periphery of the chain and then downwardly below the chain. The rollers 142 on the upper jaw means engage the upper side of the guide rail 187 and support the jaw means in a generally upright attitude as shown in FIG. 5, as the jaw means moves along the forward run 72a of the chain. A rail 188 overlies the path of movement of the rollers 142 during movement along the forward run 72a to prevent the jaw means from accidentally swinging inwardly. As best shown in FIG. 7, a guide track 189 is positioned to engage the roller 141 on the upper jaw means as the jaw means move toward their clamping position to support the upper jaw means at the trail side thereof and maintain the upper jaw means out of clamping engagement with the webs until the upper and lower jaw means have advanced to a position in which they are in substantial opposed relation.

The upper and lower jaw means 71 and 76, as they move along the lower run 72b clamp the overlapping portions of the webs at the trailing side of the article therebetween and heat-seal and sever the webs as the jaw means pushes the articles along the article support. The webs W and W' are drawn along the jaw means as they advance along the run 72b, and provision is made for retracting the webs after the jaw means have released the same, and before completing wrapping of a succeeding article so that the webs can move into engagement with the lead side of the succeeding article. Various different arrangements can be provided for retracting one or both of the webs W and W'. Since a succeeding article may be at least partially advanced onto the article support means before the web is severed at the trail side of the succeeding article, and as the succeeding article resting on the lower web W'' would impede retraction of the same, it is necessary to retract at least the upper web W. A preferred web feed control and retracting apparatus is illustrated herein.

As previously described, the web W is supplied from a roll R rotatably supported by a shaft 51 and roller-type bearings 52. A brake mechanism designated B is provided for controlling unwinding of the web from the roll R to allow withdrawal of the web as the article is advanced through the web and along the article support, and a web retracting apparatus designated T is arranged to form a variable loop in the web intermediate the roll and the curtain to retract the web when the jaw means releases the latter. The web brake comprises a brake rod 191 which is preferably rounded at least at the underside thereof and which is guided for vertical movement by laterally spaced guides 192a and 192b. Arms 193 are nonrotatably secured to opposite ends of the rod 191 and extend laterally to a point outwardly of the periphery of the roll, and a web-engaging roller 194 extends between the outer ends of the arms and is preferably supported for free axial rotation relative thereto. The rod 191 normally rests by gravity on the periphery of web roll R and can move downwardly between the guides as the roll is unwound. Since the rod 191 is contrained against horizontal movement by the guides 192a and 192b, it produces a braking action on the web roll. The web as it unwinds from the roll, passes under the roller 194 and then upwardly over the guide rollers 53 and 54. A support roller 196 is mounted on the brake mechanism B and, as shown, the arms 193 have portions which project laterally from the rod 191 at the side opposite the arms 193, and the roller is mounted on these lateral projections to extend generally parallel to the rod, and for free axial rotation relative to the arms. The support rollers 196 are movable angularly with the arms 193 as the web tension increases, until the roller 196 rests on the periphery of the web roll R. Further tension on the web W will raise the brake rod 191 off the periphery of the roll to support the weight of the brake mechanism on the roller 196 and thereby allow relatively free rotation of the web roll. As soon as the web tension is decreased, the arm drops downwardly, and the brake rod 191 engages the periphery of the roll to brake the same. In order to control the web tension required to release the brake rod from the roll, a counterbalancing means is preferably provided and, in the embodiment shown, comprises arms 197 nonrotatably secured to opposite ends of the brake rod 191 and extending to the side thereof opposite the arms 193, and an adjustable counterweight 198 ond the arms 197.

The web tensioning and retracting apparatus T is advantageously of the pneumatic type which applies a pressure differential to a section of the web intermediate the roll R and the curtain to produce a slack loop therein and retract the web when the web is released from the clamping jaws. As shown, the web tensioning and retracting apparatus T is mounted at the inlet end of the conveyor 25, it being understood that it could be otherwise located, for example above or below the article path if desired, provided, of course, that it engages the web between the roll and the curtain. The web tensioning and retracting apparatus is best shown in FIGS. 2 and 3 and comprises a generally U-shaped trough having inlet and outlet sides designated 201 and 202, a bottom 203 and preferably laterally adjustable end members 204 which extend between the inlet and outlet sides and which are adjustable in a direction lengthwise of the trough in accordance with the width of the web being used. The web W normally extends across web support ledges 201a and 202a on the inlet and outlet sides of the trough, and a negative pressure or vacuum pump such as a centrifugal blower 205 is provided to reduce the pressure at the underside of the web to normally tend to draw the same into the trough. In the preferred form shown, a vacuum manifold 206 is provided to extend along the inlet side 201 of the trough, which vacuum manifold is connected to the inlet of the vacuum pump 205. The manifold communicates with the lower portion of the trough through openings 207 to produce a lower pressure at the underside of the web W as it passes over the support ledges 201a and 202a. In addition, at least one and preferably a plurality of small openings 207a is provided in the inlet side 201 adjacent the open end of the trough so as to draw the web snugly against the inlet side and hold the inlet side of the web against movement in either direction. The web W of material in the preferred form in a thin film of thermoplastic material and, as such, tends to cling to objects due to friction and/or static charges that build up in the film. Provision is also made to facilitate retraction of the web over the outlet side 202 and, for this purpose, a plurality of openings designated 208 is provided in the outlet side 202 of the trough adjacent the open end thereof to draw atmospheric air into the trough between the web and the outlet side 202. The holes are made relatively small, preferably of the order of 1/16", and tend to form a thin film of air between the web and the outlet side of the trough which facilitates drawing of the web into the trough. Additional openings indicated at 208a, preferably in the form of a row of small openings of the order of 1/16" in diameter are advantageously provided in the web support ledge 202a to draw air in through the ledge and under the web to further facilitates movement of the web thereover.

With the above described web feeding and tensioning arrangement, it will be seen that the web can be freely withdrawn from the roll R during forward movement of the articles and that the brake mechanism B will automatically brake the web roll R when the web tension is decreased incident to releasing of the web by the clamping jaws, and that the web tensioning and retracting apparatus T will then retract the portion of the web intermediate the roll and the curtain to draw the curtain rearwardly relative to the article path into engagement with the lead side of the next succeeding article.

A similar brake mechanism designated B' is herein shown provided for the roll R' that supplies the lower web W'. A modified form of web tensioning apparatus designated T' is herein shown and comprises a roller 211 which engages a loop of the web W' intermediate the rollers 56 and 57. The roller 211 is conveniently pivotally mounted on an arm 212 and is gravitationally urged downwardly to form a loop in the web W'. Auxiliary roll supports designated 213 and 214 may be provided for supporting extra rolls of the web material, if desired, to reduce the down time when one of the supply rolls is exhausted.

Figure 20:
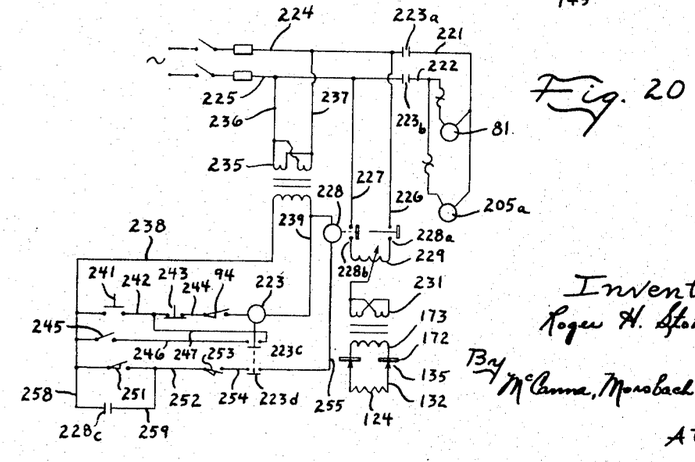
FIG. 20 is a schematic wiring diagram illustrating the controls for the wrapping apparatus.
Figure 21:
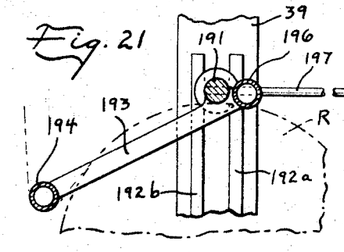
FIGS. 21 and 22 are fragmentary sectional views illustrating a web supply and tensioning means in different moved positions thereof.
Figure 22:
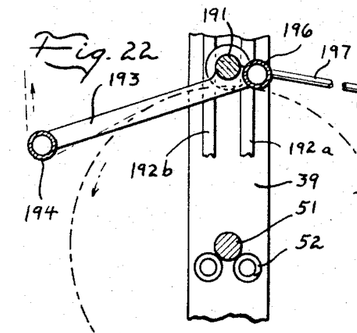

A control circuit for the wrapping apparatus is diagrammatically illustrated in FIG. 20. As illustrated therein, the drive motor 81 and the motor 205a for the vacuum pump 205 are connected through conductors 221 and 222 and relay contacts 223a and 223b to power supply conductors 224 and 225 leading to a power source (not shown). The power supply conductors 224 and 225 are also connected as through conductors 226 and 227, relay contacts 228a and 228b and variable transformer 229, to a transformer 231, the secondary of which is connected to the aforedescribed conductors 173 leading to the electrically conductive shoes 172. As the jaw means 71 moves along the lower run 72b, the brushes 135 come into wiping contact with the shoes 172 and establish a circuit to the resistance wire 124 carried by the jaws. The primary of a transformer 235 is connected through conductors 236 and 237 to the power supply conductors 224 and 225, and the secondary of this transformer is connected to a control circuit including conductors 238 and 239. The control circuit includes a motor start circuit connected to conductors 238 and 239 and comprising serially connected, normally open, manually operable start switch 241, conductor 242, normally closed, manually operable stop switch 243, conductor 244, normally closed switch 94 and relay actuator 223. Relay actuator 223 is operative when energized to close the normally open relay contacts 223a and 223b to the motors 81 and 205a to start the same. A holding circuit is provided and includes serially connected, normally closed "jog" switch 245, conductor 246, normally open relay contacts 223c and conductor 247 connected across the start switch 241 to establish a holding circuit for the relay 223 when the latter is energized. A heater control circuit including a normally open switch 251, conductor 252, normally closed switch 253, conductor 254, normally open relay contacts 223d, conductor 255 and relay actuator 228 are connected in a series circuit with each other and to the supply conductors 238 and 239. A holding circuit for the relay 228 is provided and includes conductor 258, normally open relay contacts 228c and conductor 259 connected in series with each other and in parallel to the switch 251. As previously described, the normally closed switch 94 is operated to its open position in response to a movement of the transmission anchor lever 92 in the event of an overload in the machine and, when opened, will deenergize relay actuator 228 to stop the machine. The "jog" switch 245 is normally closed and is opened only when it is desired to effect intermittent manual operation of the apparatus under the control of the start switch 241. The switches 251 and 253 are mounted as shown in FIGS. 1–5 alongside the path of movement of the upper jaw means 71 and have actuators 251a and 253a positioned to be engaged by a part of the upper jaw means such as the rollers 141. Normally open switch 251 is arranged so as to be actuated before the switch 253, and the switches 251 and 253 are mounted for adjustment longitudinally of the path of movement of the jaws to control the timing and duration of energization of the heat-sealing wire 124.

Starting of the machine is effected by closing the normally open start switch to establish a circuit through the normally closed stop switch 243, normally closed switch 94 and relay actuator 223 to energize the latter. When actuator 223 is energized, it closes contacts 223a and 223b to energize the drive motor 81 and vacuum pump motor 205a. In addition, it closes contacts 223c and 223d. The closing of contacts 223c establishes a holding circuit in parallel with the start switch 241 so that reopening of the start switch does not deenergize the relay 223. When the normally open switch 251 is thereafter closed by the passage of the jaw means 71 thereby, a circuit is established through the normally closed switch 253 and relay contacts 223d to the relay actuator 228. Energization of the latter closes the relay contacts 223a and 223b to establish a circuit to the heat-sealing wire 124. Closing of relay actuator 228 also closes the normally open contacts 228c in parallel with the switch 251 to thereby provide a holding circuit for the relay 228 to maintain the latter energized. When the jaw means thereafter moves past the switch 253, it opens the circuit to the relay actuator 228 and opens the circuit to deenergize the heat-sealing wire 124.

When the wrapping apparatus is operated to wrap groups of articles, it has been found advantageous to use lateral guides designated 261 in FIG. 4. The guides are adjustably supported by brackets 262 on the support plates 31 and 32 and are spaced above the article support means 26 a distance sufficient to clear the path of travel of the upper jaw means 71 as the latter moves along the lower run 72b thereof. The lateral carton guide means 261 are preferably shaped as shown in phantom in FIG. 3 to also extend upwardly alongside the path of travel of the upper jaw means 71 as they move along the run 72c so that the wrapper W when released by the jaw means, will be guided between the guides 261. In this manner, the guides 261 also function to laterally locate the curtain or webs W and W'.

Figure 6:
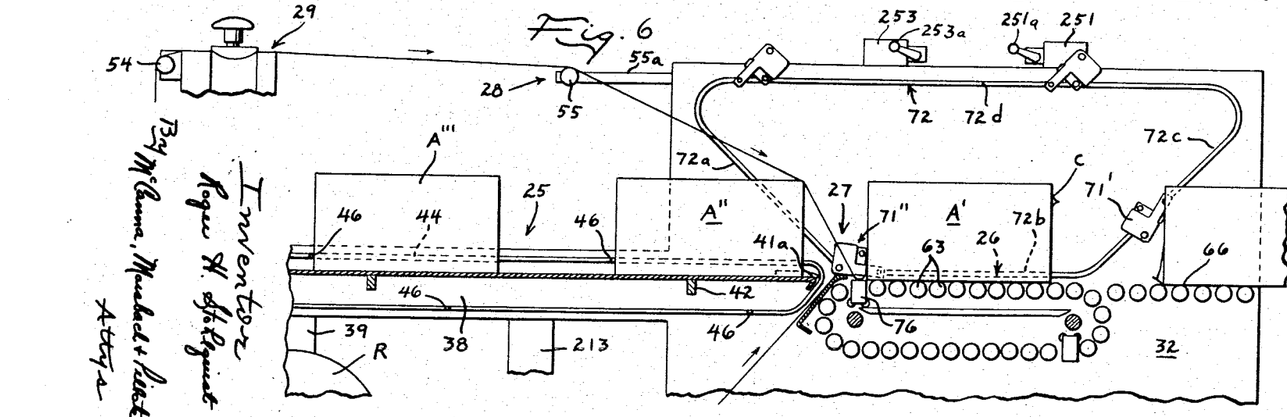

The webs W and W' having previously been joined together as by manually drawing a section of both webs between the upper and lower jaw means as they are advanced, forms a curtain which extends crosswise of the article path as shown in FIG. 3. Articles designated A are successively advanced by the conveyor means 25 into the web. As the first article is advanced to the outlet end of the conveyor 25 and onto the article support means 26, the lead side of the article engages the curtain of the material and draws the webs W, W' therewith along the top and bottom of the article and, when the article pushers 46 pass around the end of the inlet conveyor as shown in FIG. 5, advance of the articles is interrupted. The article support means 26 provides a dwell support for the articles, that is, it supports the articles in a substantially stationary position until the paw means 71 moves downwardly and inwardly along the run 72a to press the curtain against the trail side of the article on the support means and to thereafter advance the article along the support means as the jaw means moves along the run 72b. After the upper jaw means 71 has engaged the trail side of the article and has started movement of the article along the path, the lower jaw means moves into opposed relation to the upper jaw means and clamps the overlapping portions of the web to the upper jaw means as shown in FIG. 6. The overlapping portions of the webs are severed by the wire 124 and heat-sealed at opposite sides of the severance while the articles are being advanced by the jaw means. The webs W and W' are pulled along the jaw means during forward movement thereof. Severance of the webs at the trail side of the article separates the wrapped article from the remainder of the webs and rejoins the webs to re-form or reconstitute the curtain of material. As the jaw means approaches the end of the run 72b, clamping pressure on the jaw means is released to release the rejoined webs. The retracting means T then operates to retract the upper web until the curtain either engages the lead side of the next succeeding article or if there is no succeeding article being advanced onto the article support means by the inlet conveyor 25, then both the upper and lower retracting means T and T' poreate together to retract the curtain back to the position shown in FIG. 3 at the outlet end of the conveyor 25. The jaw means are spaced apart along the chain 72 a distance greater than the distance measured along the lower run 72b in which the jaw means are maintained in clamping engagement with the web. Thus, as diagrammatically illustrated in FIGS .5 and 6, the web is released from the jaw means 71' at the trail side of one article A' before a succeeding jaw means 71" moves into clamping engagement with the web at the trail side of the succeeding article A". As soon as the jaw 71' releases the webs, the web retracting means operates to retract the web. The web is spaced from the lead side of the succeeding article A" at the instant that the jaw 71' releases the web and the air in the space between the web and the article causes the web to billow somewhat as shown in phantom at C' in FIG. 5 during retraction of the webs until the air can escape at the sides of the article. Retraction of the web allows the curtain to closely engage the lead side of the article as shown in solid lines at C in FIG. 5 and, since the succeeding jaw means moves downwardly into abutting engagement with the trailing side of that article before the webs are clamped to the jaw means, the seal is effected at a point closely adjacent the trail side of the article to thereby produce a relatively close wrap. Stated otherwise, the webs are drawn tightly around the trail side of the article during sealing and the line of seal of the webs is spaced from the rear side of the article a minimum distance corresponding to the spacing between the sealing wire 124 and the front clamping jaw 102. In the absence of a succeeding article being advanced onto the loading platform by the inlet conveyor means, the web will be retracted to the outlet of the inlet conveyor as shown in FIG. 3. In this position, the jaw means 71 and 76 do not engage the web so that they can operate continously along their respective courses without withdrawing further wrapping material, and until a succeeding article is advanced by the inlet conveyor means.

As will be seen, the articles withdraw material as they are advanced into the curtain by the inlet conveyor means 25, and the amount of material withdrawn is determined by the size of the articles. Advance of the articles by the inlet conveyor means is interrupted when the trail side of the articles reaches the end of the inlet conveyor so that the trail side of the articles is always located at a preselected location independent of the side of the articles.

Consequently, the method and apparatus assures a relatively close wrap on the articles independent of size, and without requiring any change in the spacing of the jaws or the timing of the apparatus. In fact, articles of widely different size and shape can be intermixed and alternately wrapped on the wrapping apparatus. Moreover, the articles can be grouped and wrapped in groups if desired. In order to laterally compress grouped articles and to maintain the web centered, the laterally spaced guides 261 are advantageously provided and mounted to extend alongside the path of movement of the groups of articles on the article support means 26.

What is claimed as new is:

1. A method of wrapping articles in heat-sealable material comprising, supporting a curtain of said material to extend crosswise of an article path, advancing an article by direct engagement therewith in a forward direction along the article path against one side of said curtain to draw the curtain across opposite sides of the article and until the trail side of the article reaches a preselected location along said article path, moving a first jaw means at the other side of the curtain laterally of said article path into engagement with the trail side of said article at said preselected location to draw portions of the curtain closely along the trail side of the article, thereafter advancing the article along said path away from said one location by moving the first jaw means in a forward direction in pushing engagement with the trail side of the article, clamping overlapping portions of the curtain at the trail side of the article to said first jaw means after the first jaw means engages the trail side of the article and maintaining the overlapping portions in clamping engagement with the first jaw means during at least a portion of said forward movement of said first jaw means, and severing and sealing the overlapping portions of the curtain at both sides of the severance while said overlapping portions are clamped to said first jaw means to thereby separate the wrapping article from the curtain.

2. The method of claim 1 including advancing a succeeding article along said article path with the lead side thereof spaced from the trail side of the first mentioned article, releasing the overlapping portions from clamping engagement with the first jaw means, and retracting the curtain into engagement with the lead side of the succeeding article.

3. A method of wrapping articles in heat-sealable material comprising:
   (a) supporting end sections of two webs of said material at relatively opposite sides of an article path, the ends of which sections have previously been joined to form a curtain extending crosswise of said path;
   (b) advancing an article by direct engagement therewith in a forward direction along said article path against one side of said curtain to draw the curtain across opposite sides of the article and until the trail side reaches a preselected position;
   (c) moving a first jaw means at the other side of said curtain in a closed loop course:
      (1) inwardly and forwardly relative to said path from a first location outwardly and rearwardly of said preselected position into engagement with the trail side of the article at said preselected position to draw portions of the curtain closely along the trail side of the article,
      (2) then forwardly in a direction generally lengthwise of the article path to advance the article by pushing engagement therewith away from said preselected position,
      (3) then outwardly away from said article path,
      (4) and then rearwardly at a level outwardly of the articles as they are advanced along the path to said first location;

(d) moving a second jaw means at said other side of the curtain into opposed relation to said first jaw means after said first jaw means engages the trail side of the article to clamp overlapping portions of the curtain to said first jaw means at said trail side of the article, and (e) severing and sealing the overlapping portions at both sides of the severance while said overlapping portions are clamped to said first jaw means to separate the wrapped article from the curtain and to rejoin the webs to reconstitute the curtain.

4. The method of wrapping successive articles in a heat-sealable wrapping material comprising, supporting end sections of two webs of wrapping material at opposite sides of an article path, the ends of which webs have previously been joined to form a curtain extending crosswise of said path; advancing an article in a forward direction along said path against one side of the curtain to draw said curtain across opposite sides of that article and until the trail side of that article reaches a preselected location along the path; advancing a succeeding article along the path with the lead side thereof spaced a substantial distance from the trail side of the preceding article; moving a first jaw means at said other side of the curtain in a direction crosswise of said path into substantial abutting engagement with the trail side of the article at said preselected location to draw the web closely along the trail side of the article at said one location, thereafter advancing the article from said one position by moving the first jaw means in a forward direction in pushing engagement with the trail side of the article; clamping overlapping portions of the webs at the trail side of the article to said first jaw means after the first jaw means has moved into substantial abutting engagement with the trail side of the article at said first location, severing and sealing the overlapping portions of the webs at both sides of the severance while the overlapping portions are clamped to said first jaw means to separate the wrapped article from the webs and to rejoin the webs; releasing the rejoined webs from clamping engagement to the first jaw means, and retracting at least one of the webs until the curtain engages the lead side of the next succeeding article.

5. The method of wrapping successive articles in a heat-sealable wrapping material comprising, supporting end sections of two webs of wrapping material at opposite sides of an article path, the ends of which webs have previously been joined to form a curtain extending crosswise of said path; advancing an article in a forward direction along said path against one side of the curtain to draw the curtain across opposite sides of the article and until the trail side of the article reaches a preselected location along the path, advancing a succeeding article along said path with the lead side thereof spaced a substantial distance from the trail side of the preceding article, clamping the webs together closely adjacent the trail side of the first mentioned article between opposed jaws and moving the jaws in pushing engagement with the trail side of the first mentioned article to advance that article along the path from said preselected location and to pull webs with the advancing article, severing the webs at the trail side of the first mentioned article and sealing the webs together at both sides of the severance as that article is pushed by said opposed jaws to separate the wrapped article from the webs and rejoin the webs; releasing the jaws from clamping engagement with the webs at the trail side of the first mentioned article after the webs have been severed and sealed and before clamping the webs together at the trail side of the succeeding article, and retracting at least one of the joined webs after release thereof to assure that the curtain formed by the webs closely engages the lead side of the succeeding article as the latter is advanced to said preselected location.

6. A method of wrapping articles in heat-sealable material comprising, supporting a curtain of said material to extend crosswise of an article path, advancing an article in a forward direction into one side of the curtain, moving a pair of jaw means at the other side of the curtain into positions at the trail side of the article with at least one jaw means engaging the trail side of the articles, advancing the jaw means in a forward direction with at least one jaw means in pushing engagement with the article ot advance the article and draw the curtain of material forwardly therewith, bringing the pair of jaw means into clamping engagement with each other to clamp overlapping portions of the curtain therebetween at the trail side of the article after the jaw means have engaged the trail side of the article, maintaining the jaw means in clamping engagement with the curtain during at least a portion of the forward movement of the article by the jaw means and sealing and severing the overlapping portions of the curtain while clamped between the jaw means, thereafter releasing the jaw means from clamping engagement with the curtain and retracting the curtain for engagement by the lead side of a subsequent article.

7. An apparatus for wrapping articles in a heat-sealable web of material comprising, means supporting a curtain of material to extend crosswise of an article path, an article support means having an inlet end at one side of said curtain and constructed and arranged to provide a dwell support for an article advanced thereon, means for advancing an article in a forward direction along said article path against the other side of the curtain and onto said support means to draw the curtain closely along the lead side of the article and at least partially along the top and bottom of the article, a first jaw means at said one side of the curtain, and means for moving said jaw means along a first jaw run laterally inwardly of said article path into substantial abutting engagement with the trail side of the article whereby the jaw means presses the curtain against the trail side of the article and for thereafter moving said jaw means along a second jaw run extending forwardly generally lengthwise of said article support means to advance the article along said support means by pushing engagement with the trail side of the article, means for clamping overlapping portions of the curtain to the jaw means at the trail side of the article as the jaw means moves along at least a portion of said second jaw run whereby the curtain is drawn along with the jaw means, means for severing the overlapping portions and for sealing the same on opposite sides of the severance while the overlapping portions are clamped to the jaw means, and means for retracting the curtain toward the inlet end of the article support means when the overlapping portions have been severed and released from clamping engagement with the jaw means.

8. A wrapping apparatus according to claim 7 wherein said article support means includes a plurality of rollers adapted to underlie and support the article and mounted for free rotation about their axes to allow free movement of the article onto and off from the article support means.

9. A wrapping apparatus according to claim 8 wherein the rollers are mounted on an endless chain having an upper run for supporting the articles, said means for clamping overlapping portions of the curtain to said first jaw means including a second jaw means mounted on said endless chain for movement therewith, means for driving said chain in timed relation with the movement of said first jaw means to move said second jaw means in said forward direction along said upper run of the chain in opposed registry with said first jaw means as the latter moves along at least a portion of said second run, said rollers being adapted to rotate about their axes as said chain is advanced to prevent advancing of the article along the support means until it is pushed by said jaw means.

10. A wrapping apparatus according to claim 9 wherein the upper surface of said second jaw means during movement along the upper run of said chain is disposed at a level adjacent said rollers.

11. An apparatus for wrapping articles according to claim 7 wherein said means for clamping the overlapping portions of the curtain to said jaw means includes a second jaw means mounted for movement in opposed registry with said first jaw means as the latter moves along at least a portion of said second run, said first and second jaw means each including front and rear clamping paws and a sealing jaw between the respective front and rear clamping jaws and movable relative thereto, the sealing jaw on one of said jaw means being normally offset outwardly of its clamping jaws and the sealing jaw on the other of said jaw means being normally offset inwardly of its clamping jaws, heat-sealing and cutting means on one of said sealing jaws, means for pressing said first and second jaw means together as they move along a portion of said second run operative to first bring the front clamping jaws into clamping engagement with the overlapping portions of the curtain; then bring the rear clamping jaws into clamping engagement with the overlapping portions of the curtain, and to thereafter bring the sealing jaws into engagement with the overlapping portions and to press the inwardly offset sealing jaw on said one jaw means in a direction toward a plane through the end faces of the clamping jaws on that jaw means.

12. An apparatus for wrapping articles according to claim 7 including means for supplying said web of material to said curtain, said curtain retracting means including means defining first and second web supports engaging said web of material at spaced locations intermediate said supply means and said curtain, and means for producing a difference in air pressure on opposite sides of said web intermediate said first and second supports to yieldably urge the web into a slack loop between said supports.

13. An apparatus for wrapping articles according to claim 7 wherein said means for advancing articles onto said support means includes an endless-type conveyor having an outlet end at the inlet end of the support means, article pushing elements on said conveyor for pushing articles by engagement with the trail side thereof to move the articles onto the support means and position the trail side of the articles adjacent the inlet of the support means.

14. An apparatus for wrapping articles according to claim 13 wherein said first jaw means is mounted on endless track means for movement sequentially along said first and second runs and through a return run back to said first run, and means for driving said endless track means and said endless-type conveyor in continuous fashion and in timed relation with each other.

15. An apparatus according to claim 14 wherein said means for clamping overlapping portions of said curtain includes a second jaw means mounted on an endless track having one run generally paralleling said second run of said first jaw means, and means for driving said last mentioned endless track in timed relation with said first mentioned endless track.

16. An apparatus for wrapping articles in a heat-sealable material comprising, web support means for supporting end sections of two webs of said material respectively above and below an article path, the ends of which webs have previously been joined to form a curtain extending crosswise of said path, article support means having an inlet end adjacent one side of said curtain and constructed and arranged to provide a dwell support for an article, inlet conveyor means having an outlet end adjacent the other side of said curtain for advancing an article in a forward direction along said path into said curtain and onto said article support means to draw the curtain across the lead side of the article and along the top and bottom sides of the article, said inlet conveyor means being operative to interrupt advance of the article thereby when the trail side of the article reaches a preselected position, laterally spaced endless track means at opposite sides of said path above said article support means, at least one upper jaw means extending between said endless track means for movement therewith along a closed loop course having upper and lower runs and inlet and outlet runs extending between said upper and lower runs, the lower portion of said inlet run intersecting said preselected position of the trail side of the article and said lower run extending generally lengthwise of said article support means, means for driving said track means to move said upper jaw means successively downwardly along said inlet run to draw the curtain downwardly and press the same against the trail side of the article on the article support means and then forwardly along the lower run to advance the article along the article support means by pushing engagement therewith, means for clamping overlapping portions of the webs at the trail side of the article to said upper jaw means as it moves along at least a portion of said lower run, means for severing the overlapping portions and for sealing the same at opposite sides of the severance to seal the webs at the trail side of the wrapper and to rejoin the webs to re-form the curtain, and means for retracting at least one of said webs after the webs have been severed and rejoined.

17. A wrapping apparatus according to claim 16 including at least one other upper jaw means extending between said track means and spaced therefrom along said course a distance greater than the length of said lower run.

18. A wrapping apparatus according to claim 16 wherein said inlet run extends from a point above the tops of the articles downwardly and forwardly toward said preselected location.

19. A wrapping apparatus according to claim 18 wherein the inlet run defines an angle of about 45° with respect to the article path.

20. A wrapping apparatus according to claim 18 wherein said outlet run is inclined upwardly and forwardly relative to said path of travel to a level above the tops of the articles.

21. A wrapping apparatus according to claim 16 wherein said inlet run converges downwardly and forwardly relative to said article path to a zone adjacent the inlet end of said article support means, said web support means including an upper web guide spaced above and rearwardly with respect to said article path at a location such that the web extending from said upper web guide to said inlet end of said support means converges relative to said path at a shallower angle than said inlet run.

22. A wrapping apparatus according to claim 16 wherein said upper jaw means is swingably mounted on said track means for swinging movement about an axis paralleling said jaw means, and jaw guide means is provided for maintaining the jaw in a preselected attitude during movement along said lower run.

23. A wrapping apparatus according to claim 16 wherein said upper jaw means is pivotally mounted on said track means for movement about an axis offset from the lead side of said jaw means, a follower on the jaw means radially offset from the pivot axis of the jaw means, and a jaw guide rail engageable with said follower for maintaining the jaw means in a preselected attitude during movement along said lower run.

24. An apparatus for wrapping articles according to claim 16 wherein said means for clamping the web to the upper jaw means includes a lower jaw means mounted for movement in a closed loop course having an upper run generally paralleling the lower run of the upper jaw course, and means for moving said lower jaw means in timed relation with the movement of said upper jaw means.

25. An apparatus for wrapping articles according to claim 24 wherein said first and second jaw means each includes front and rear clamping jaws and a sealing jaw between the respective front and rear clamping jaws and movable relative thereto, the sealing jaw on one of said jaw means being normally offset outwardly of its clamping jaws and the sealing jaw on the other of the jaw means being normally offset inwardly of its clamping jaws, heat-sealing and cutting means on one of said sealing jaws, means operative as the upper jaw means moves along a portion of its lower run for pressing the front clamping jaws together and for thereafter pressing the rear clamping jaws together and for thereafter pressing the inwardly offset sealing jaw on said other jaw means into engagement with the outwardly offset sealing jaw.

26. An apparatus for wrapping articles according to claim 24 wherein said first jaw means includes a first sealing jaw connected to said track means and extending therebetween, a front clamping jaw mounted at the front side of said first sealing jaw for movement relative thereto, means including a front jaw stop yieldably urging the front jaw downwardly relative to the first sealing jaw to normally position the front jaw a preselected distance below the first sealing jaw, a rear clamping jaw mounted for movement relative to the first sealing jaw and relative to the front jaw and means including a rear jaw stop yieldably urging the rear jaw downwardly relative to the first sealing jaw to normally position the rear jaw a distance less than said preselected distance below the first sealing jaw, said second jaw means including a second sealing jaw and front and rear clamping jaws on opposite sides of the second sealing jaw and movable relative thereto, and means operative as said first jaw means moves along its lower run to press said first sealing jaw downwardly.

27. An apparatus according to claim 16 including lateral article guides mounted above said article support means to extend above the path of travel of said upper jaw means during movement of the jaw means along the lower run thereof, said guides being located intermediate the ends of the jaw means to laterally guide the articles during movement along the article support means.

28. An apparatus for wrapping articles according to claim 7 including means for supplying said web of material to said curtain, said curtain retracting means including means defining a trough having an open side engaging said web intermediate said supply means and said curtain, means communicating with the trough in a region spaced from the open end thereof for producing a sub-atmospheric pressure in said trough whereby atmospheric pressure acting on the outer side of the web will yieldingly urge the web into a slack loop in the trough.

29. An apparatus according to claim 28 wherein said trough has an inlet side where the web enters from the supply means and an outlet side where the web leaves the trough and extends to the curtain, said outlet side of the trough having a plurality of atmospheric vents adjacent the open side thereof to allow atmospheric air to enter the trough beneath the web at the outlet side of the trough.

References Cited

UNITED STATES PATENTS

| | | | |
|---|---|---|---|
| 3,164,937 | 1/1965 | Ingram | 53—198 X |
| 3,237,371 | 3/1966 | Gerlach | 53—182 |

THERON E. CONDON, *Primary Examiner.*

NEIL ABRAMS, *Assistant Examiner.*

U.S. Cl. X.R.

53—182, 229; 156—515, 583